United States Patent [19]

Willis

[11] Patent Number: 4,595,953

[45] Date of Patent: Jun. 17, 1986

[54] TELEVISION RECEIVER HAVING CHARACTER GENERATOR WITH BURST LOCKED PIXEL CLOCK AND CORRECTION FOR NON-STANDARD VIDEO SIGNALS

[75] Inventor: Donald H. Willis, Indianapolis, Ind.

[73] Assignee: RCA Corporation, Princeton, N.J.

[21] Appl. No.: 666,861

[22] Filed: Oct. 31, 1984

[51] Int. Cl.$^4$ .............................................. H04N 5/445
[52] U.S. Cl. .................................. 358/183; 358/192.1; 358/149
[58] Field of Search ...................... 358/183, 188, 191.1, 358/22, 192.1, 148, 149

[56] References Cited

U.S. PATENT DOCUMENTS

| | | | |
|---|---|---|---|
| 4,281,345 | 7/1981 | Warn | 358/149 |
| 4,346,407 | 8/1982 | Baer et al. | 358/149 |
| 4,464,679 | 8/1984 | Wargo | 358/148 |
| 4,477,841 | 10/1984 | Chen et al. | 358/335 |

OTHER PUBLICATIONS

An Introduction to the MB88303 Television Display Controller, published by Fujitsu, Ltd., Second English Ed., Nov. 1982.

Primary Examiner—Tommy P. Chin
Attorney, Agent, or Firm—P. J. Rasmussen; P. M. Emanuel; R. G. Coalter

[57] ABSTRACT

A television receiver includes a character generator for producing alphanumeric data or graphic symbols to be displayed along with a received video signal. An oscillator, locked to a multiple of the color subcarrier frequency of the video signal, supplies a clock signal to the character generator for controlling the timing of displayed character elements. A delay circuit coupled to the character generator and controlled by a measuring circuit imparts an effective delay to the character elements in proportion to the time difference between a transition of the clock signal and the horizontal synchronizing component of the video signal. The delay compensates for temporal and spacial distortions of displayed characters which otherwise would tend to occur when the ratio of the color subcarrier frequency with respect to the horizontal line rate of the video signal is "non-standard" (e.g., other than 910:1 for NTSC or 1135:1 for PAL).

3 Claims, 7 Drawing Figures

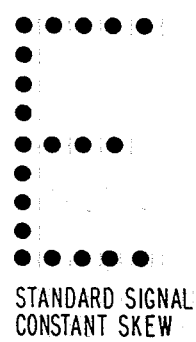
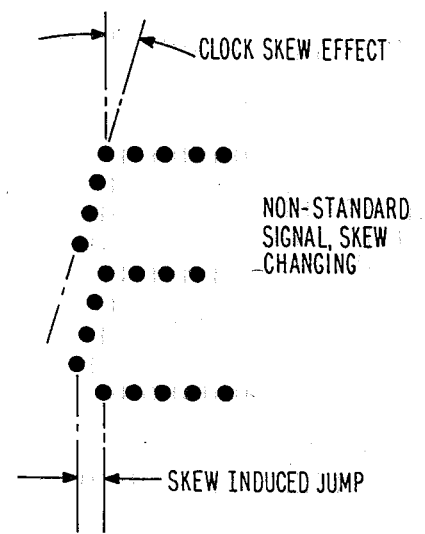
Fig. 1A
Fig. 1B

TELEVISION RECEIVER HAVING CHARACTER GENERATOR WITH BURST LOCKED PIXEL CLOCK AND CORRECTION FOR NON-STANDARD VIDEO SIGNALS

FIELD OF THE INVENTION

This invention relates to television receivers or monitors of the type having a character generator for producing alphanumeric characters or graphic symbols in raster scan form for display along with (or in place of) a received "picture" signal and which includes a clock locked to the color burst component of the picture signal for controlling the timing of picture elements produced by the character generator.

BACKGROUND OF THE INVENTION

Raster scan caption generators are useful in television receivers for displaying various types of information such as teletext data, time and channel settings, computer data and so on. In a typical generator individual alphanumeric characters or graphic symbols are represented by a dot matrix pattern stored in a read only memory (ROM). A character is generated for display by transferring a desired dot pattern from the ROM to a high speed buffer and sequentially shifting the character "dots" or "pixels" (picture elements) out of the buffer with a pixel or dot clock. The serial signal, thus formed, is applied to a kinescope in a timed relation to the vertical and horizontal sweep so as to display the dot matrix pattern at a desired location on the raster.

It is known that the clock which determines the pixel timing may be either "line-locked" or "burst-locked". A line-locked clock is one which is synchronized to operate at a frequency which is an integral multiple of the horizontal line frequency. The advantage of line-locking the pixel clock is that each character dot of the caption signal will have a stable position on a displayed line even though the line frequency may vary. If, for example, the line frequency decreases making the sweep longer, the dot clock frequency will also decrease proportionately, thereby increasing the pixel period to compensate for the longer sweep time. The net effect for a line-locked pixel clock is that variations of the pixel width and position due to variations in the horizontal line frequency are relatively unnoticeable. This is a distinct advantage when displaying captions along with a video signal provided by a source which may have a non-standard or unstable line frequency (e.g., a video tape recorder, video disc player, etc.).

Notwithstanding the advantages of line-locking the character generator dot clock, there are applications where it is advantageous to employ "burst-locking" instead. In a burst-locked system, the clock used for pixel timing is locked to a multiple of the color subcarrier frequency by means of a burst keyed phase locked loop (PLL). An advantage of burst locking is that conventional color television receivers include a color oscillator locked to incoming burst thereby eliminating the need for a separate high frequency dot clock for the character generator. The color subcarrier reference frequency is also useful for decoding teletext data transmitted during the vertical blanking interval of received video signals. Burst-locked clocking is particularly important in digital television receivers where the composite video signal is sampled and converted to digital form for processing. In such systems the use of a clock locked to the color subcarrier reference frequency aids in minimizing cross-color effects and other undesirable artifacts in displayed images and simplifies chroma demodulation. An integrated circuit which includes a teletext decoder and a character generator that is switchable between teletext input provided by the teletext decoder and an external data input and which is intended for use with a burst-locked clock is described at pages 139–141 of the data book entitled "DIGIT 2000 VLSI DIGITAL TV SYSTEM" published September 1981, by Deutsche ITT Industries GmbH.

SUMMARY OF THE INVENTION

The present invention resides, in part, in the recognition of a problem which can occur in television systems of the type wherein the clock for the character generator is locked to a multiple of the color subcarrier frequency rather than to a multiple of the line scanning (horizontal synchronizing) frequency. The problem, explained in detail subsequently with reference to FIGS. 1A, 1B and 2, is manifested as temporal and spacial distortions of displayed characters which can occur when receiving "non-standard" video signals. A non-standard video signal, as used herein, is defined as one wherein the ratio of the color subcarrier frequency to the horizontal line frequency does not conform to a specific fixed standard (e.g. 227.5:1 for NTSC or 283.75:1 for PAL). Sources which may produce non-standard signals include video tape recorders, video disc palyers, video game units, home computers, etc.

A television receiver embodying the invention includes a video processing means responsive to a video input signal for supplying a processed video output signal to a display means. An oscillator means provides a clock signal having a frequency locked to a multiple of the color subcarrier frequency of the video input signal. A character generator means supplies a character signal to the display means in raster scan form, each line of the character signal comprising a plurality of character elements, the character generator means having a timing clock input coupled to the oscillator means for controlling the timing of the character elements. A measuring means provides a skew indicating signal proportional to the time difference between a given transition of the clock signal and a horizontal synchronizing component of the video input signal. A variable delay means is coupled to the character generator means and to the measuring means for effectively inparting delay to the character signal in accordance with the skew indicating signal.

BRIEF DESCRIPTION OF THE DRAWINGS

The invention is illustrated in the accompanying drawings wherein like elements are identified by like reference designators and in which:

FIGS. 1A, 1B and 2 are diagrams illustrating certain aspects of the problems to which the invention is addressed;

In FIG. 2 waveform "B" represents the output of a clock that is phase-locked to operate at four times the frequency of the color burst component of a video signal represented by waveform A for the case where the video signal conforms to the NTSC standard in which there are exactly 227.5 cycles of the color subcarrier per line. As shown, there are exactly 910 clock cycles during one line interval and thus the position (X) of the first clock pulse (No. 1) with respect to the center of the horizontal synchronizing pulse is the same in line N as it is in the following line, N+1. Thus, if the clock was used to time the pixels by a character generator in a receiver in which the horizontal sweep was locked to the line rate of waveform A, then the displayed character "dots" would be properly vertically aligned. For example, a character dot initiated by a given clock pulse on line N would be in exactly the same display position on the next line N+1 and illustrated in FIG. 1A. For this "standard signal" case, the "skew" or timing difference "X" between the clock and the horizontal synchronizing signal is of no consequence because it is constant from line-to-line.

Figure 2:
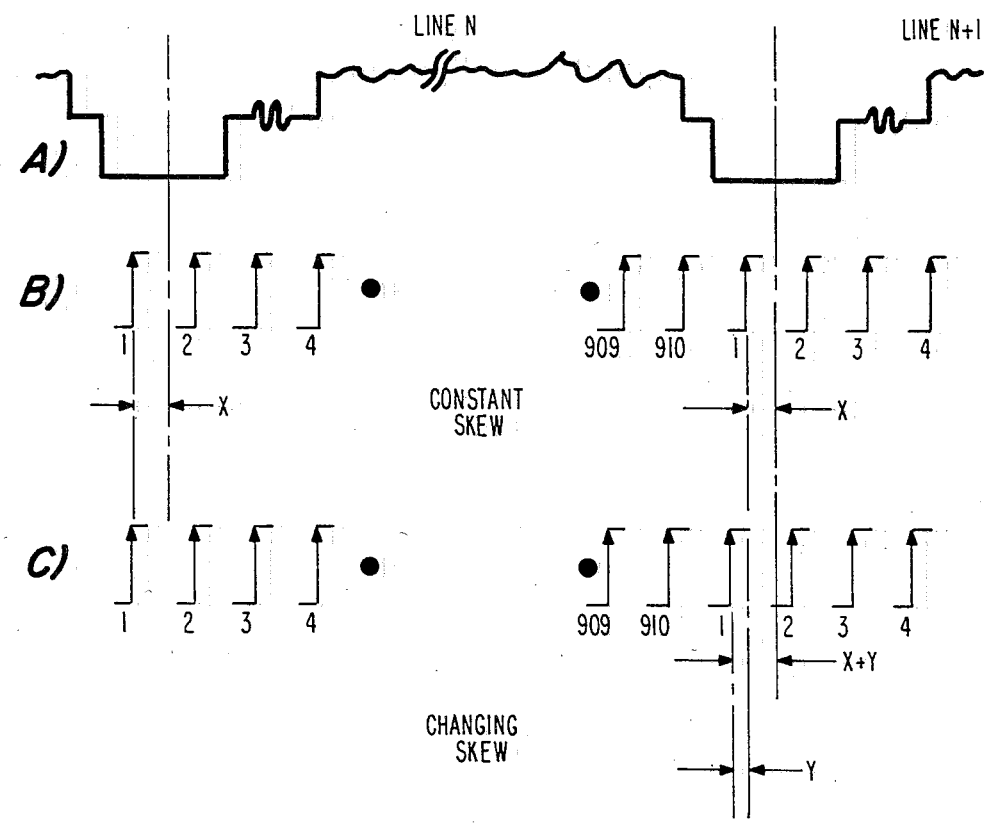

For non-standard signals, as hereinbefore defined, the skew is not constant from line-to-line (waveform C of FIG. 2) and this changing skew or "phase slip" causes spacial and temporal distortion of characters as shown in FIG. 1B. This results because the deflection system is locked to sync (waveform A) but the pixel clock, being locked to burst, is continuously precessing (or "slipping") by an amount "Y" with respect to sync for non-standard signals (waveform C). This makes the displayed character pixels precess, also, with respect to deflection. When a full cycle of clock is "slipped", and abrupt discontinuity will occur ("jump", FIG. 1B) and this discontinuity will move vertically up or down the displayed characters because it will occur on different lines of different fields. These distortions are illustrated in FIG. 1B.

Figure 3:
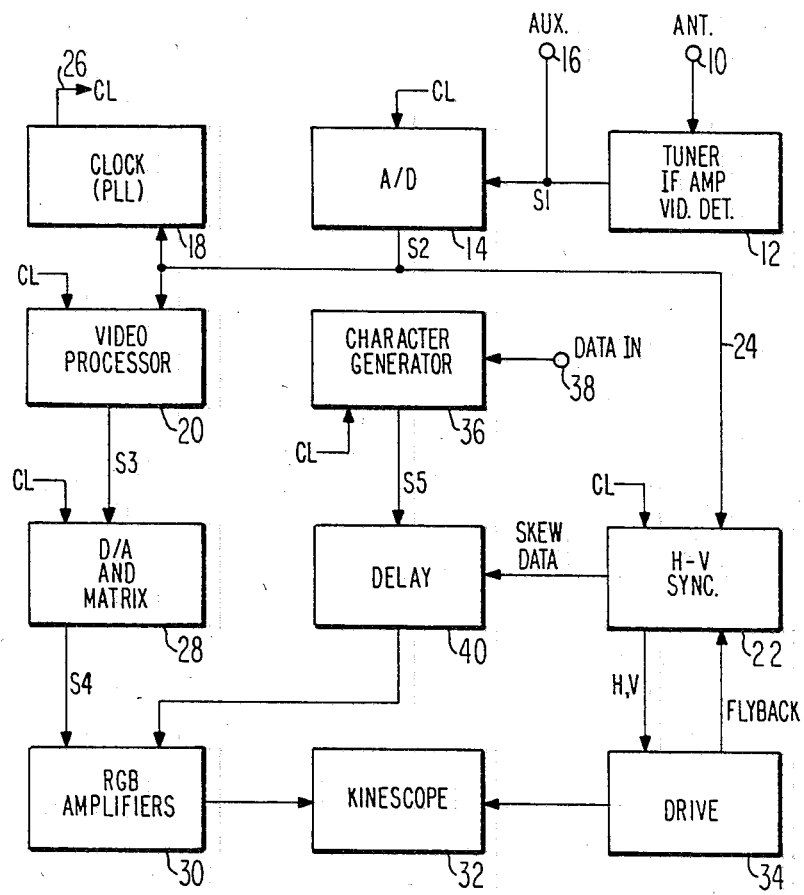
FIG. 3 is a block diagram of a digital television receiver embodying the invention.

The problem of temporal and spacial distortion of displayed characters is solved, in accordance with the invention, in the receiver of FIG. 3 by measuring the skew and effectively imparting delay to the characters in accordance with the skew measurement. By this means the character pixel positions are caused to effectively "track" the skew, and thus assume a fixed position on a line for both standard and non-standard signals even though the clock is not locked to the horizontal synchronizing component of the video input signal.

The receiver includes an antenna (ANT.) input terminal 10 coupled via a tuner, IF amplifier and video detection unit 12 of conventional design to the input of an analog-to-digital converter 14. Unit 12 processes RF modulated video signals applied to terminal 10 to provide a baseband analog video signal S1 which is converted to digital form (signal S2) in (A/D) converter 14. The RF signal may be either a standard broadcast signal provided by an antenna or cable source or it may be a non-standard signal (as herein before defined) provided by a tape recorder, video game, computer or other source. An auxilliary (AUX.) input terminal 16 is provided for obtaining the analog baseband video signal S1 from a source having provisions for baseband video output.

The digitized video signal S2 is applied to a clock 18, to a video processor 20 and to a horizontal/vertical synchronizing (H-V SYNC) unit 22 via a bus 24. Clock 18 comprises a burst keyed phase-lock-loop (PLL) and provides a clock (CL) output signal having a frequency locked to a multiple (e.g., four-times) of the frequency of the chroma subcarrier component of video signal S2. For NTSC and PAL standard signals, the clock frequencies are about 14.318 MHz and 17.734 MHz respectively. For SECAM systems the clock would be locked to four times the center frequency of the SECAM bell filter (e.g., about 17.144 MHz).

The clock signal CL is supplied via a bus 26 (indicated by arrow heads) to A/D converter 14 for controlling the sampling of signal S2 and is also applied along with digitized video signal S2 to a digital video processor 20 where signal CL controls the timing of various processing functions (e.g., color separation, peaking, contrast control, hue and saturation control etc.) provided by processor 20. The aforementioned data book describes a complete digital television receiver including digital video processor for NTSC, PAL and SECAM standards that are suitable for use as processor 20.

The processed digital video signal S3 provided by processor 20 is converted to analog RGB form in a digital-to-analog (D/A) converter and matrix unit 28 and the RGB signals S4 are applied by three RGB amplifiers in unit 30 to a kinescope 32 to be displayed. Deflection signals for kinescope 32 are generated by the horizontal/vertical synchronizing unit 22 and amplified in a drive unit 34. Characters for display on kinescope 32 are provided by a character generator 36 having a clock input coupled via bus 26 to the output of clock 18 for controlling the timing of the character "dots" or picture elements (pixels) and a data input 38 for connection to a suitable source of data to be displayed (e.g., a teletext decoder, time clock, channel indicator, external computer, etc.). The character signal S5 produced by generator 36 comprises, illustratively, R,G,B and blanking signals and is applied to the R,G and B amplifiers in unit 30 via a delay unit 40. The blanking signal is used to blank the processed video signal S4 in unit 30 in locations where characters are being displayed. Generator 36 and units 22, 30 and 34 are of conventional design and may be implemented as described in the aforementioned data book.

The function of delay unit 40, in accordance with the invention, is to impart an effective delay to characters provided by generator 36 where the delay is proportional to the skew between clock signal CL and the horizontal synchronizing component of the digitized video signal S2. In this example of the invention, the skew compensating delay is realized by delaying the output signal S5 (R,G,B and blanking) produced by character generator 36. A similar result may . . . be obtained, as will be discussed in connection with FIG. 6, by applying the skew compensating delay to the clock signal CL supplied to generator 36. The skew data, for either case, is from a phase comparator in synchronizing unit 22 which provides a number which represents a fraction of a clock period. This fraction is the portion of a clock cycle equal to the time difference between the center of the horizontal synchronizing pulse and the last clock edge (positive transition) which precedes the center as illustrated by interval X in FIG. 2B or interval X+Y in FIG. 2C. Alternatively, one may select another point in the horizontal synchronizing pulse or blanking period to make the skew measurement. An advantage of using the center of the sync pulse as compared, for example, with using only one edge, is that when the center is used the pulse may be more narrowly filtered (which would disturb the accuracy of using an edge) and the center calculated by averaging the leading and trailing edges, thereby reducing the effects of noise in the measurement.

Figure 4:
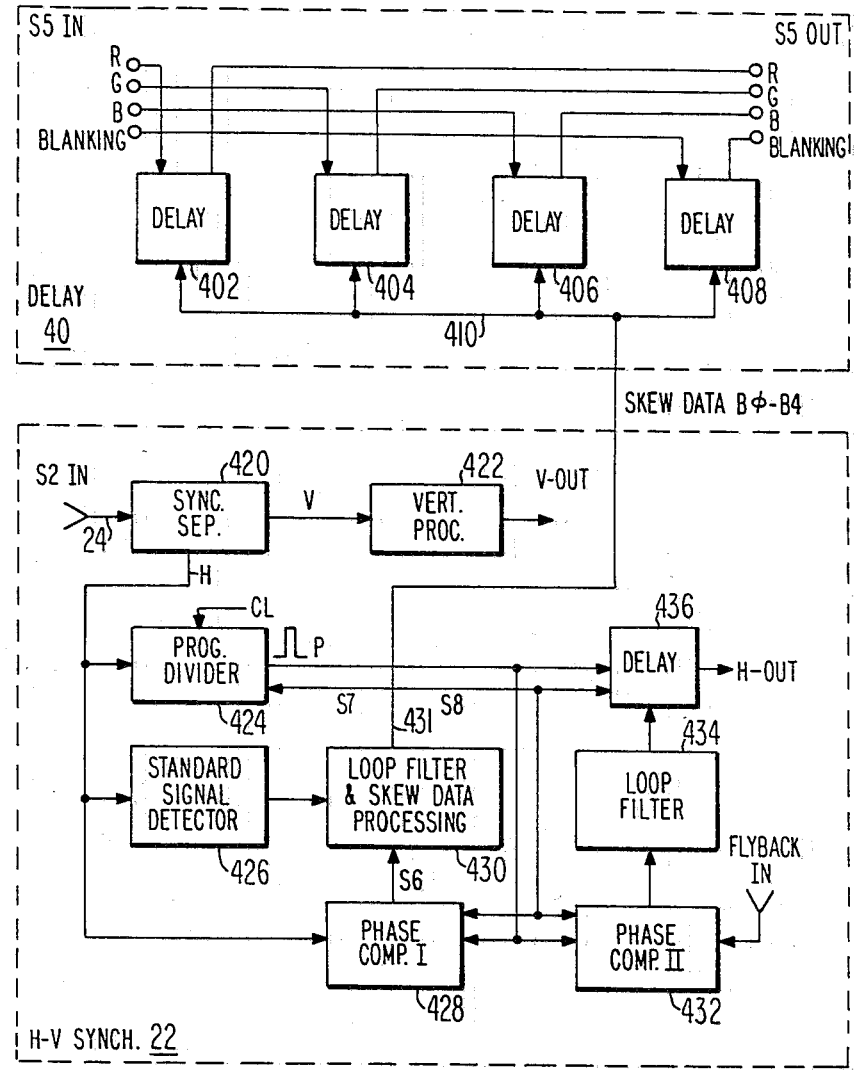
FIG. 4 is a detailed block diagram of portions of the receiver of FIG. 3.

FIG. 4 is a detailed block diagram of delay unit 40 and synchronizing unit 22 of the receiver of FIG. 1. Unit 40 comprises four individual variable delay units 402–408 having respective inputs coupled to receive the R, G, B and blanking signals (S5 IN) from character generator 36 and having outputs coupled to supply the skew compensated R,G,B and blanking signals (S5 OUT) to amplifier 30. The delay control terminals of units 402–408 are all connected to a 5-bit bus 410 for receiving the skew data from unit 22. As previously explained, unit 40 shifts (delays) the character data by an amount proportional to the clock (CL) skew with respect to horizontal sync. The skew measurement is made in unit 22 at the start of each line, averaged to reduce noise effects and the delay compensation of unit 40 is set to the averaged skew value thereby effectively compensating for the effect of clock phase precession when receiving a non-standard video input signal.

The block diagram of unit 22 is a simplified representation of the type "MAA 2500 Deflection Processor Unit" integrated circuit which is described in more detail in the aforementioned ITT databook. Unit 22 includes elements for making the skew measurements, averaging them and disabling the skew data when "standard" signals are being received. In unit 22 the video signal S2 is applied to a sync separator unit 420 which supplies a vertical sync signal, V, to a vertical processing unit 422 and a horizontal sync signal, H, to a programmable divider 424, to a standard signal detector 426 and to a phase comparator I 428. Unit 422 includes suitable vertical pulse integration and synchronization circuits for processing the vertical sync signal V for application to kinescope 32. Unit 424 divides the clock signal to provide line rate output pulses "P" which are compared by phase comparator I 428 with the sync pulses of video signal S2. The phase comparator output signal S6 is applied to a loop filter and skew data processing unit 430 in which a low pass filter averages the phase measurements. The integer portion S7 of the averaged signal is applied via bus 431 to divider 424 to change the division factor in a sense to phase lock pulse P to the incoming sync component of video signal S2. When locked, pulse P will differ in timing from sync by no more than a fraction of one cycle of the clock signal CL. The fractional portion of each phase measurement represents the time interval between the clock signal CL and horizontal sync in terms of fractions of a clock cycle. The skew data signal, which represents the line-by-line precession of the clock signal relative to sync, is "predicted" for a given line by storing the fractional portion of the average phase measurement from the previous line and adding the stored number to the previous skew data value. The fractional portion of the resultant sum is applied as the current skew data signal S8 to delay unit 40. If an overflow results from the sum, then the S7 signal is incremented by one to delay pulse P by one integer clock cycle. The skew data signal thus formed is also applied to phase comparators 428 and 432 to provide fine resolution of the phase comparison since the pulse P only occurs on clock edges and thus represents coarse phase information. The standard signal detector 426 is in essence a lock detector which disables loop filter 430 when the ratio existing between the color subcarrier frequency and the horizontal frequency corresponds to a standard ratio (910:1 for NTSC or 1135:1 for PAL).

For the purpose of equalizing phase changes in the horizontal output stage due to switching response tolerances or loading of the deflection circuits, the pulse "P" passes through a further phase-lock-loop comprising phase comparator II 432, loop filter 434 and delay unit 436. In the phase comparator II 432, the phase position between the output signal of the programmable divider 424 and the leading edge of the horizontal flyback pulse is measured (with fine resolution being provided by the skew data signal S8). The deviation from the desired phase position is filtered in filter 434 and fed to delay unit 436 which phase shifts the pulse "P" to provide the horizontal drive signal "H-out" for the horizontal driver in such a way that the horizontal flyback pulse acquires a fixed phase position with respect to pulse "P" which, in turn, retains a fixed phase position with respect to the horizontal sync component of the video signal. To avoid phase jitter in the horizontal PLL circuit, unit 436 includes an additional gate delay line for pulse "P" which is controlled by the skew data signal S8 to provide a fine resolution of the horizontal drive signal.

Figure 5:
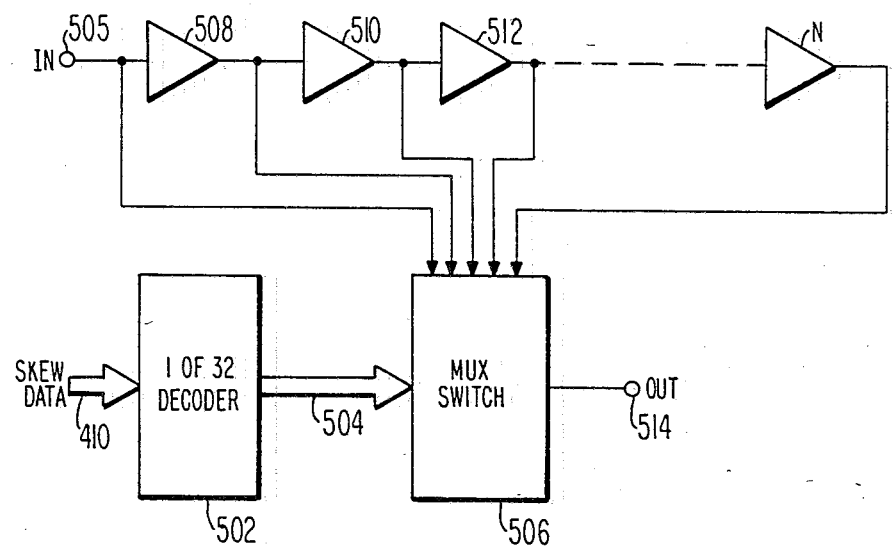
FIG. 5 is a detailed block diagram of a delay element suitable for use in the receiver of FIG. 1.

Delay units 402–408 of FIG. 4 for the receiver of FIG. 1 may be implemented as shown in FIG. 5. The 5-bit skew data bus 410 is applied to a 1-of-32 decoder 502 which supplies decoder outputs via bus 504 to a multiplex switch 506. An input signal to be delayed (e.g., R,G,B or blanking) is applied to the input terminal 505 a cascade connection of delay elements 508-512-N which may be passive devices (e.g., R-C networks) or active devices (e.g., non-inverting gates or buffer amplifiers). The outputs or taps of the cascade connection are coupled to the inputs of switch 506 which couples the output of a selected element to an output terminal 514 in response to the decoded skew data supplied by bus 504. If, for example, the skew data is zero, switch 506 couples input terminal 505 to output terminal 414. If the data value is "3" (00011 binary), switch 506 couples the output of element 512 to terminal 514 thereby imparting a delay to the input signal of three "units". A unit delay, illustratively, may be on the order of one sixteenth of the period of clock signal CL (e.g., about four nanoseconds for a 14.3 MHz clock) to thereby provide a total delay range of about two full clock periods.

Figure 6:
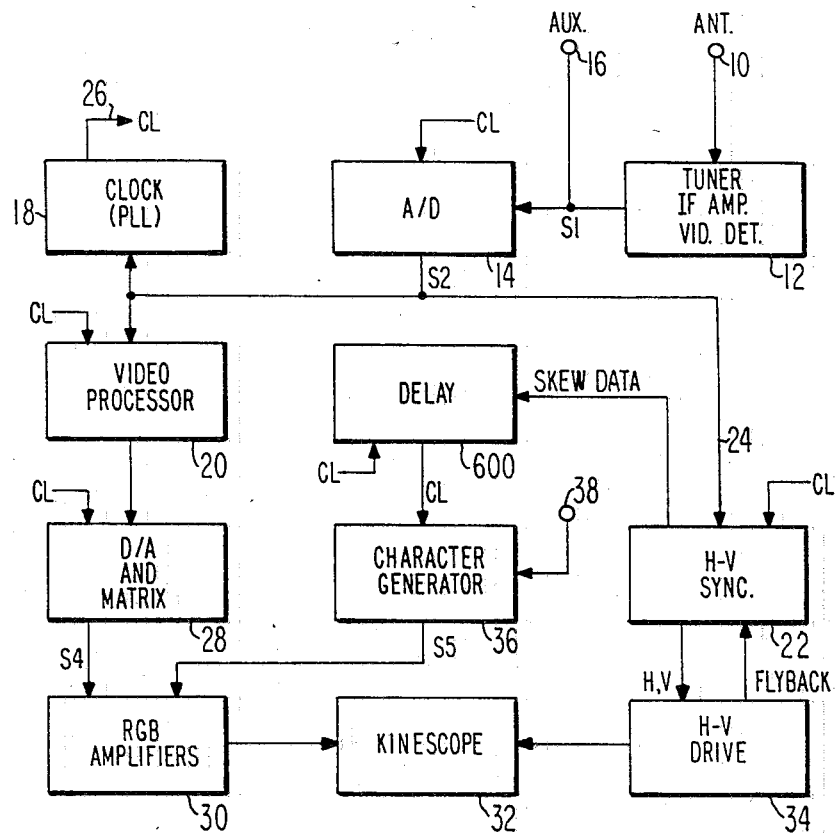
FIG. 6 is a block diagram illustrating a modification of the receiver of FIG. 1.

FIG. 6 represents a modification of the receiver of FIG. 1 wherein the output signal S5 of character generator 36 is effectively delayed by delaying the clock signal CL supplied to generator 36 rather than delaying the individual R,G,B and blanking output signals S5. This is done by connecting the output of generator 36 directly to the R,G,B amplifier unit 30 and interposing a delay unit 600 in the clock line (bus 26) for generator 36. Delay unit 600, illustratively, may be of the type shown in FIG. 5.

I claim:
1. A television receiver, comprising:
  video processing means having an input for receiving a video input signal and an output for providing a processed video output signal;
  display means coupled to said processing means for displaying said processed video output signal;
  oscillator means responsive to said video input signal for providing a clock signal having a frequency locked to a multiple of the color subcarrier frequency of said video input signal;
  character generator means having an output coupled to said display means for supplying a character signal thereto in raster scan form, each line of said character signal comprising a plurality of character elements, said character generator means having a timing clock input terminal coupled to said oscillator means for controlling the timing of said character elements in accordance with said clock signal;

measuring means for providing a skew indicating signal proportional to the time difference between a given transition of said clock signal and a horizontal synchronizing component of said video input signal; and variable delay means coupled to said character generator means and to said measuring means for effectively imparting delay to said character signal in accordance with said skew indicating signal.

2. A television receiver as recited in claim 1, wherein said variable delay means is interposed in a path between said character generator means and said display means.

3. A television receiver as recited claim 2, wherein said character generator means is of a providing R,G,B and blanking output signals and said variable delay means comprises a respective delay means for each of said R,G,B and blanking output signals and circuit means for applying said skew indicating signal to a control input each of said separate delay means.

* * * * *